United States Patent [19]

Barthel

[11] 3,816,148

[45] June 11, 1974

[54] COMPOSITION AND PROCESS FOR STRENGTHENING AND SEALING GEOLOGICAL FORMATIONS AND STRATA IN MINING AND DEEP DRILLING

[75] Inventor: Horst Barthel, Hamburg, Germany

[73] Assignee: Oil Base Germany GmbH & Co. KG, Hamburg, Germany

[22] Filed: July 12, 1972

[21] Appl. No.: 271,008

[30] Foreign Application Priority Data
July 12, 1971 Germany............................ 2134722
Aug. 13, 1971 Germany............................ 2140618

[52] U.S. Cl.................. 106/107, 106/106, 166/293
[51] Int. Cl................................................ C04b 9/02
[58] Field of Search .......... 106/106, 107, 105, 314, 106/315

[56] References Cited
UNITED STATES PATENTS

| 448,512 | 3/1891 | Enricht .............................. 106/106 |
| 1,468,930 | 9/1923 | Sullivan ............................. 106/106 |
| 2,526,837 | 10/1950 | Woodward.......................... 106/106 |
| 3,560,230 | 2/1971 | Previte.............................. 106/314 |

*Primary Examiner*—Delbert E. Gantz
*Assistant Examiner*—James W. Hellwege

[57] ABSTRACT

Geological formations and strata are strengthened, solidified, and sealed in mining and deep drilling by means of a Sorel cement mixture containing a small amount of a water soluble ammonium salt such as ammonium chloride. A small amount of an aminoplast may be added. The magnesium oxide component of the Sorel cement may have admixed thereto magnesia usta.

8 Claims, No Drawings

COMPOSITION AND PROCESS FOR STRENGTHENING AND SEALING GEOLOGICAL FORMATIONS AND STRATA IN MINING AND DEEP DRILLING

BACKGROUND OF THE INVENTION

1. Field of the Invention

The present invention relates to a process for strengthening, stabilizing, and sealing geological formations and strata in mining and in deep drilling and to compositions useful in carrying out such a process.

2. Description of the Prior Art

In mining and deep drilling frequently it becomes necessary to solidify and/or seal geological formations and strata. This is of special importance in rock salt and potash mining and also when it is desired to temporarily seal drilled and tapped petroleum and natural gas occurrences.

When mining rock salt and especially in potash mining, there are encountered again and again inflows of brine into the drill hole which inflows must be sealed. In general, such brines are not saturated and thus cause dissolution and leaching out of the rock salt or potash minerals. As a result thereof the possibility that water will enter the drill hole is considerably and continually increased.

Usually Sorel cement is employed for sealing such so-called leaching or brine flows and areas. Sorel cement, which is also called magnesia cement, has a noteworthy adhesion to salt.

Sorel cement consists essentially of a concentrated aqueous solution of magnesium chloride and pulverulent magnesium oxide. This mixture forms initially a plastic mixture which, on standing, solidifies and sets to a marble-like hardened product.

For instance, 70 parts of magnesium oxide powder are mixed with 30 parts of a saturated magnesium chloride solution (specific gravity: 1.3), while stirring. According to Wuerzner, the magnesium oxide attracts the water present in the magnesium chloride solution, combines therewith, and thus is transformed into magnesium hydroxide. The resulting magnesium hydroxide attracts the magnesium chloride and binds it firmly. This reaction proceeds exothermically. i.e., with the evolution of heat.

Sorel cement, however, has the disadvantage that it is not resistant against magnesium sulfate present in the inflow of water or brine. Furthermore, the hardening time of Sorel cement cannot be regulated satisfactorily. Proper regulation of the hardening time is of special importance when supplying under pressure large amounts of such a Sorel cement sludge. Finally the resulting exothermic reaction causes in turn formation of cracks and fissures in the hardened cement supplied to the drill hole.

When drilling to depths of 8000 m. to 8500 m., there are encountered the following additional problems. In order to stabilize the drill hole in greater depths against the pressure of the bedrock, the specific gravity of the drilling fluid must be increased to between about 1.25 kg./l. and about 2.2 kg./l. On drilling 27 petroleum or natural gas, the drilling fluid will penetrate into the deposit and will plug it if the petroleum and/or gas pressure in the deposit is lower than the petrographic pressure. Therefore, the borehole must be sealed. However, the heretofore known sealing materials are not stable under the geothermic conditions prevalent at such depths. The sealing material, furthermore, must be readily removable by means of hydrochloric acid or hydrofluoric acid after inserting the casings and cementing them in order to make available the deposit or bed for production.

Conventionally manufactured and used Sorel cement is unsuitable for this purpose due to its very short setting time.

SUMMARY OF THE INVENTION

It is one object of the present invention to overcome the disadvantages encountered heretofore in using Sorel cement for stabilizing and sealing geological formations and strata in mining and deep drilling, said Sorel cement being of a specific novel composition.

Another object of the present invention is to provide a valuable and novel Sorel cement composition especially useful for stabilizing and sealing geological formations and strata in mining and deep drilling.

A further object of the present invention is to provide a process for stabilizing and sealing geological formations and strata in mining and deep drilling which process is free of the disadvantages of the heretofore used processes for this purpose.

Other objects of the present invention and advantageous features thereof will become apparent as the description proceeds.

In principle the process according to the present invention for stabilizing, solidifying, and sealing off geological formations and strata in the mining industry and in deep drilling technique by means of Sorel cement is characterized by the feature that a Sorel cement is used which contains a small amount of a water soluble ammonium salt. Preferably ammonium chloride is used. The amount of ammonium salt added to the Sorel cement need not exceed about 10%. In place of ammonium chloride, there can be used, for instance, ammonium sulfate, ammonium carbonate, ammonium nitrate, ammonium phosphate or other water soluble ammonium salts.

According to a preferred embodiment of the present invention a further improvement of the Sorel cement is achieved by adding thereto a small amount of an aminoplast, i.e. an amount of about the same magnitude as that of the ammonium salt added.

Sometimes it is of advantage that a relatively large amount of magnesia usta, i.e., of magnesium oxide made by prolonged calcining of magnesium carbonate at a low temperature, as obtained from sea water, is added to the magnesium oxide ingredients of the Sorel cement. The amount of magnesium usta may be between about 30 percent and about 70 percent. Any magnesium oxide prepared below 900°C. which is easily hydrated with water, can be used as Sorel cement ingredients.

DESCRIPTION OF THE PREFERRED EMBODIMENTS

The following examples serve to illustrate the present invention and especially the advantages achieved according to this invention without, however, being limited thereto.

The following Sorel cement compositions were used in the tests described hereinafter.

EXAMPLE 1

The conventional Sorel cement consists of
  65 parts of magnesium oxide obtained by flotation and
  35 parts of a magnesium chloride solution of the specific gravity of 1.3.

This cement has a setting time of 45 minutes whereby the temperature increases from 20°C. to 62°C.

EXAMPLE 2

The Sorel cement according to the present invention consists of
  60 parts of floated magnesium oxide obtained by flotation,
  30 parts of a magnesium chloride solution of the specific gravity of 1.3, and
  10 parts of ammonium chloride.

This cement has a setting time of 3.5 hours and the temperature increases from 20°C. to 36°C.

EXAMPLE 3

The Sorel cement according to the present invention consists of
  60 parts of floated magnesium oxide,
  30 parts of a magnesium chloride solution of the specific gravity of 1.3,
  10 parts of ammonium fluoride, and
  10 parts of a urea-formaldehyde resin not completely condensed.

This cement has a setting time of 12.5 hours, whereby the temperature increases from 20°C. to 25°C.

The Sorel cement according to example 1 has the lowest resistance after setting against magnesium sulfate solution while the Sorel cement according to example 3 has the best stability and resistance against magnesium sulfate solution.

A sample of each of the Sorel cements according to the preceding examples 1, 2, and 3 are heated, after setting, in an autoclave filled with a brine containing magnesium chloride, sodium chloride, and magnesium sulfate. The autoclave was kept at 60°C. and at an inert gas pressure of 100 atmospheres for 72 hours. Thereafter the samples were removed from the autoclave and examined.

The sample of example 1 showed arachnoid or cobweblike fissures and cracks. Its surface becomes slimy.

The sample of Example 2 showed only two small fissures.

The sample of example 3 was unchanged. The change in the setting time of the three samples is caused by the addition of ammonium chloride which delays the conversion of magnesium oxide into magnesium hydroxide.

At the same time the ammonium chloride acts as hardening or curing agent upon the aminoplast. The aminoplast provides the Sorel cement with a coating, seals its pores, and, due to its stability against the brine, increases its stability.

The Sorel cement compositions according to examples 2 and 3 are especially useful in deep drilling technique not only because their setting time is sufficiently prolonged but also because they have the further advantage that they can be redissolved very readily by means of hydrochloric acid or hydrofluoric acid after hardening.

For instance, for drilling to a depth of 7500 meters, a setting time of the Sorel cement between about 6 hours and about 8 hours is required for pumping the plug of Sorel cement to the drilled area so as to seal the hole. For this purpose the following Sorel cement composition has proved to be especially useful.

EXAMPLE 4

The Sorel cement composition is composed of a mixture of
  900 g. of magnesium chloride ($MgCl_2 \cdot 6 H_2O$),
  900 cc. of water,
  150 g. of floated magnesium oxide,
  180 g. of magnesia usta (magnesium oxide recovered from sea water), and
  80 g. of ammonium chloride.

The specific gravity of the mixture is 1.7 and corresponds to the specific gravity of conventional drilling muds so that a further increase of the specific gravity is not required. Such a Sorel cement sets within 12 hours and 15 minutes.

A sample of the set cement was exposed to a heat treatment at 250°C. for 24 hours. No cracks or fissures or other changes were observed after such a heat treatment. When adding the heat treated sample to a 15 percent aqueous hydrochloric acid solution, it is dissolved completely without residue within 35 minutes. Thus the Sorel cement of example 4 meets all the requirements of a sealing agent for deep drilling purposes.

As stated hereinabove, the setting time can be adjusted by varying the composition of the Sorel cement. If, for instance, a setting time of 6 hours is required, the Sorel cement mixture is composed as follows:

EXAMPLE 5

900 g. of magnesium chloride ($MgCl_2 \cdot 6 H_2O$),
  900 cc. of water,
  200 g. of floated magnesium oxide,
  95 g. of magnesia usta,
  90 g. of ammonium chloride.

It is evident that variation of the proportion of floated magnesium oxide, magnesia usta, and ammonium salt changes the setting time.

Although the urea-formaldehyde resins have proved to be especially useful, other aminoplasts can also be used, such as, for instance, the melamin-formaldehyde resins and the urea-melamin-formaldehyde resins. Preferably the initial, still water-soluble condensation products are used for the purpose of this invention. Monomethylol urea and dimethylol urea and corresponding mono-methylol and dimethylol melamine can also be used. In general aminoplasts which are obtained by reaction of a polyamino compound with formaldehyde in the presence of magnesium oxide have proved to yield satisfactory results provided they are polycondensation products which are still water-soluble.

It is to be understood that the designated upper limit of the amount of ammonium salt added is not a critical limit but is given as a practical limit since the employment of greater amounts does not lead to additional advantages.

The term "magnesia usta" as used hereinbefore and in the claims annexed hereto indicates any type of magnesium oxide which reacts much more slowly and sluggishly with magnesium chloride than magnesium oxide as conventionally used in the manufacture of Sorel cement. Preferably magnesia usta is obtained by chemical precipitation of sea water.

I claim:

1. A composition for strengthening, solidifying, and sealing geological formations and strata in mining and deep drilling, said composition having a specific gravity of between about 1.25 and 2.2 kg./l. and comprising a Sorel cement composition having admixed therewith from about 3 to about 10 percent by weight of a water soluble ammonium salt and from about 3 to about 10 percent of a water soluble, incompletely condensed aminoplast obtained by reacting a polyamino compound with formaldehyde.

2. The composition as defined by claim 1, wherein said water soluble ammonium salt is ammonium chloride.

3. The composition as defined by claim 1, wherein the aminoplast is selected from the group consisting of urea-formaldehyde resins, melamine-formaldehyde resins and urea-melamine-formaldehyde resins.

4. The composition as defined by claim 3, wherein said aminoplast is a urea-formaldehyde resin.

5. The composition as defined by claim 1, consisting essentially of about 60 parts of magnesium oxide, about 30 parts of an aqueous magnesium chloride solution (specific gravity: 1.3), about 10 parts of ammonium chloride, and about 10 parts of an incompletely condensed aminoplast.

6. A composition for strengthening, solidifying, and sealing geological formations and strata in mining and deep drilling, said composition having a specific gravity between about 1.25 and 2.2 kg./l. and comprising a Sorel cement composition having admixed therewith between about 3 and 10 percent of a water soluble ammonium salt and from about 30 to about 70 percent of magnesia usta based upon the total magnesium oxide content of the Sorel cement.

7. The composition as defined by claim 6, consisting essentially of about 900 parts of magnesium chloride $MgCl_2 \cdot 6 H_2O$, about 900 parts of water, about 150 parts of magnesium oxide, about 180 parts of magnesia usta, and about 80 parts of ammonium chloride.

8. The composition as defined by claim 6, consisting essentially of about 900 parts of magnesium chloride $MgCl_2 \cdot 6 H_2O$, about 900 parts of water, about 200 parts of magnesium oxide, about 95 parts of magnesia usta, and about 60 parts of ammonium chloride.

* * * * *